A. M. LEONI.
MOWING MACHINE.
APPLICATION FILED JUNE 6, 1908.

919,040.

Patented Apr. 20, 1909.
4 SHEETS—SHEET 3.

WITNESSES
Edw. Thorpe
F. D. ———

INVENTOR
Alphonse M. Leoni
BY
Munn & Co.
ATTORNEYS

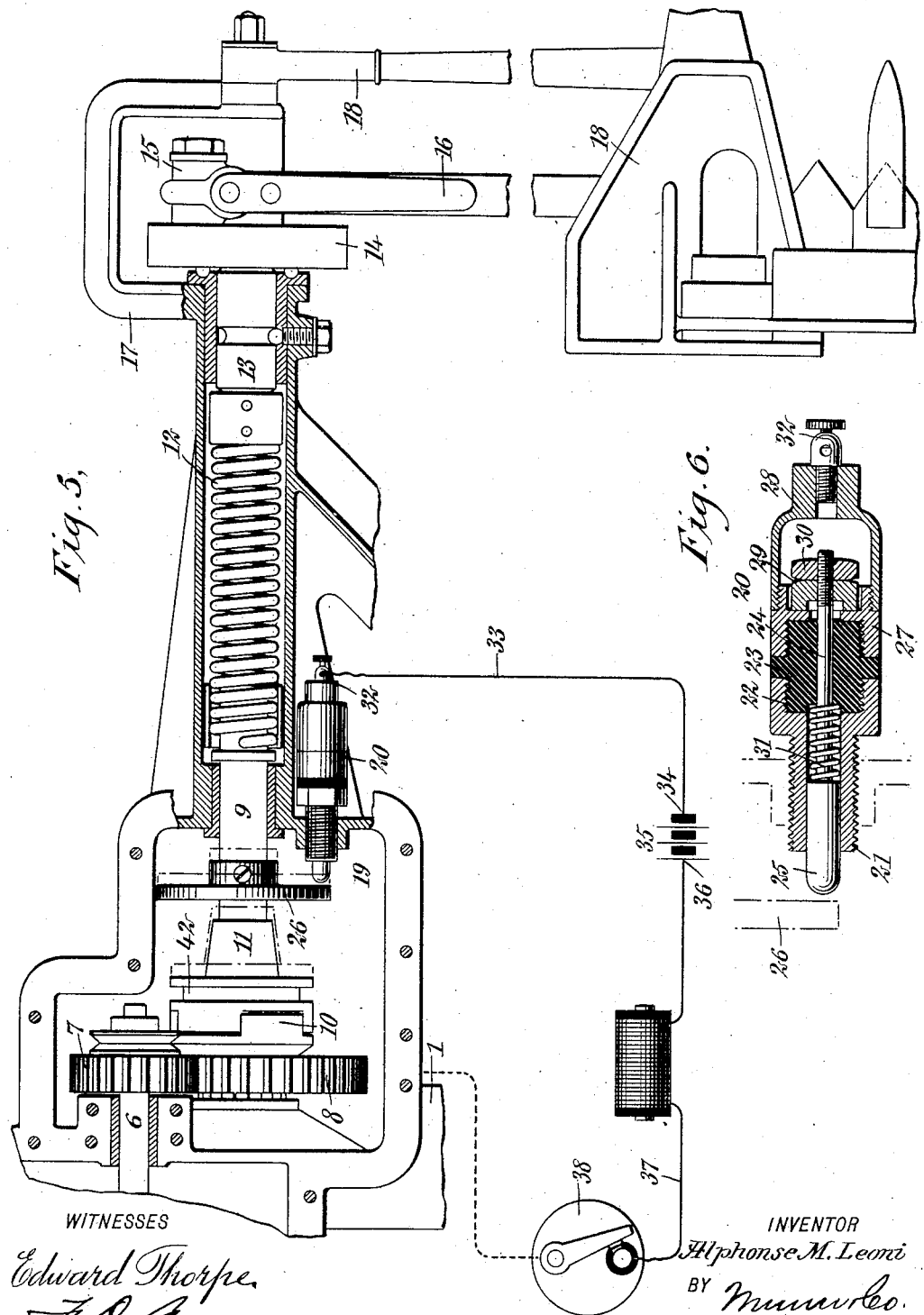

UNITED STATES PATENT OFFICE.

ALPHONSE M. LEONI, OF HIGHLAND, NEW YORK, ASSIGNOR TO THE AGRICULTURAL MACHINES IMPROVEMENT COMPANY, OF NEW YORK, N. Y., A CORPORATION OF NEW YORK.

MOWING-MACHINE.

No. 919,040.   Specification of Letters Patent.   Patented April 20, 1909.

Application filed June 6, 1908. Serial No. 437,141.

*To all whom it may concern:*

Be it known that I, ALPHONSE M. LEONI, a subject of the King of Italy, and a resident of Highland, in the county of Ulster and State of New York, have invented a new and Improved Mowing-Machine, of which the following is a full, clear, and exact description.

This invention relates to mowing machines, and especially to the type of mowing machine covered by my patent application, Serial No. 427,775, filed April 18, 1908. In this type of machine the mower bar is driven by an engine, while the machine is drawn along by draft animals.

In this invention I drive the mower bar by means of a gasolene engine, and I employ a special transmission device which operates in such a way that if obstructions come between the teeth of the cutter, the ignition circuit connected with the spark plug will be opened so as to stop the engine. The mower bar is driven from the engine through a clutch, and I provide automatic means for opening this clutch when the mower bar is raised.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
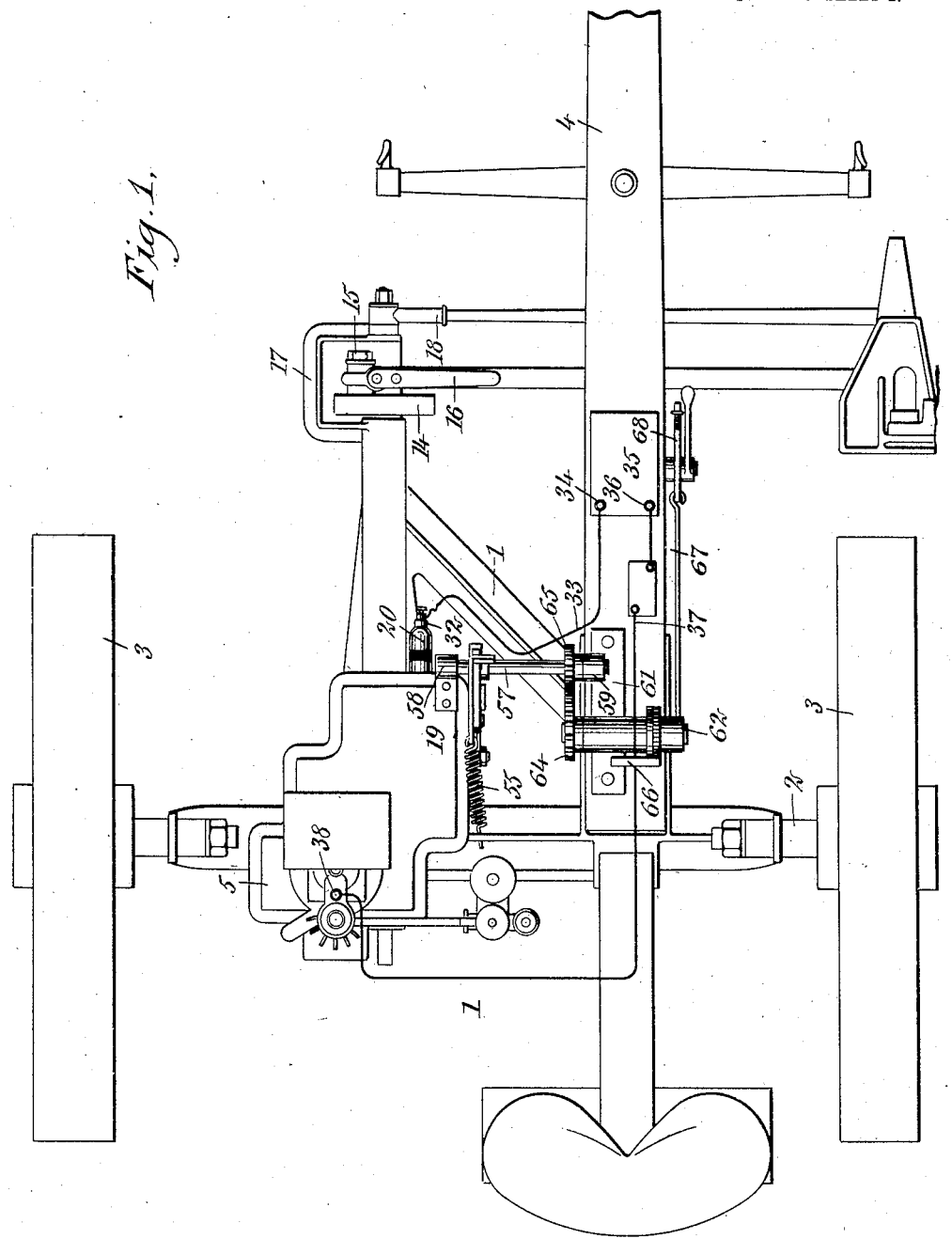
Figure 2:
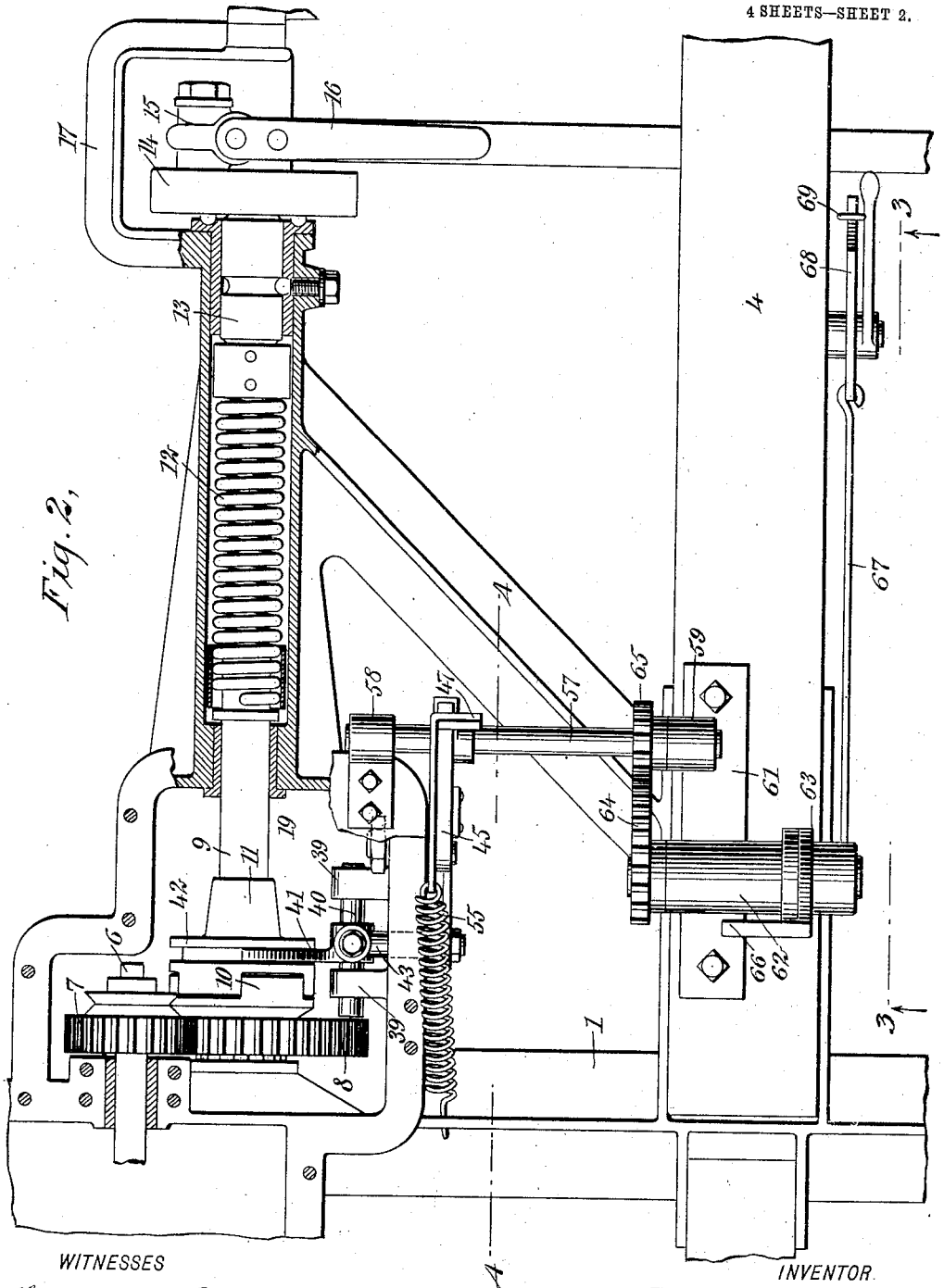
Figure 3:
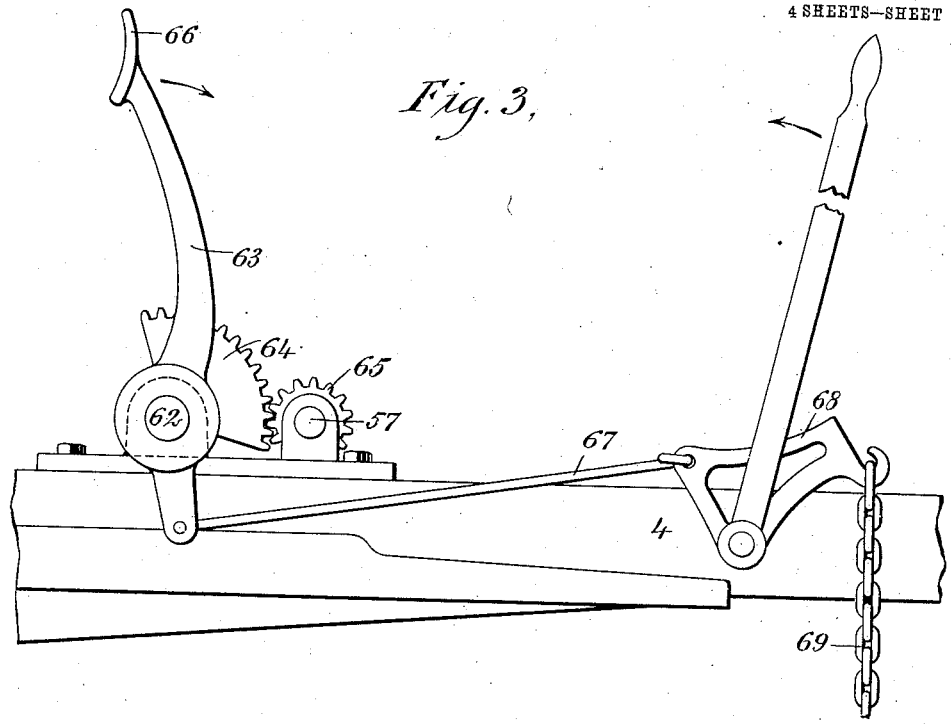
Figure 4:
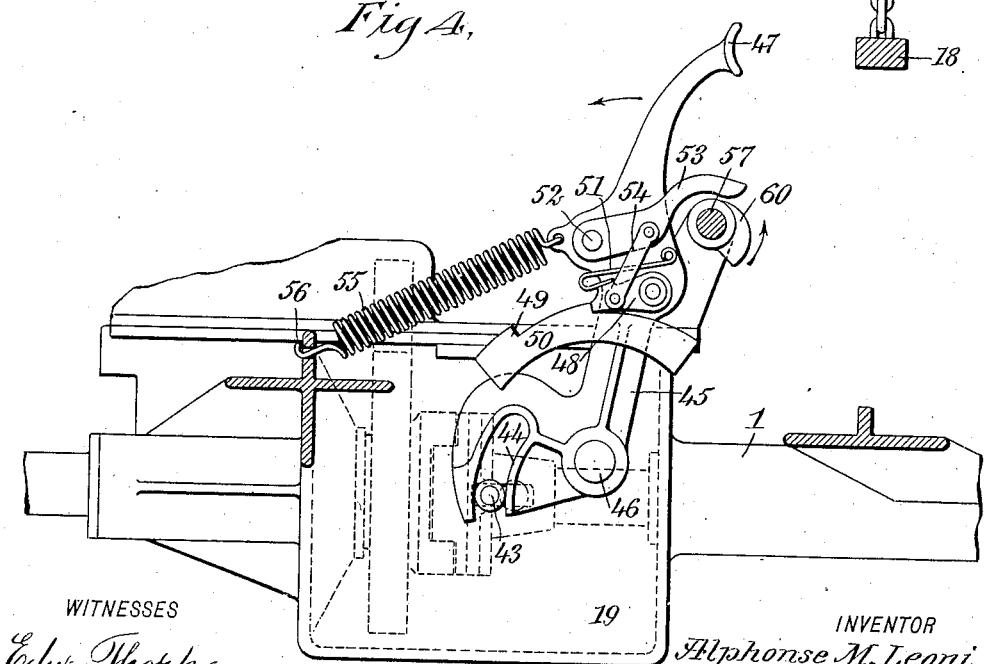

Figure 1 is a plan of a mowing machine to which my invention has been applied, a portion of the pole and the forward part of the machine being shown broken away; Fig. 2 is a plan of a part of the machine shown upon an enlarged scale, certain parts being shown in cross section so as to indicate the transmission mechanism through which the mower bar is driven; Fig. 3 is a side elevation, looking in the direction of the line 3—3 in Fig. 2, a part appearing in section, and illustrating parts of the mechanism for throwing open the clutch automatically when the mower bar is raised; Fig. 4 is a vertical section on the line 4—4 of Fig. 2; Fig. 5 is a view somewhat similar to Fig. 2, but showing especially the transmission mechanism, and also showing diagrammatically in detail the ignition circuit and the mechanism for opening the same automatically, and Fig. 6 is a longitudinal section through a switch plug employed.

Referring more particularly to the parts, and especially to Fig. 1, 1 represents the frame of the machine which has an axle 2 with wheels 3 which enable the machine to be drawn along by draft animals attached to the pole 4. On the left of the pole, a gasolene engine 5 is mounted, and the shaft 6 of this engine is indicated in Fig. 2 as connected by means of gears 7 and 8 with a transmission shaft 9. Rigid with the gear wheel 8 there is provided a clutch member 10; coöperating with this clutch member there is a clutch member 11 which slides on the shaft 9, and is adapted to couple the shaft 9 to the engine when the mower bar is in operation. The transmission shaft 9 includes a flexible driving member in the form of a coil spring 12, which extends forwardly on the frame, and attaches to a stub shaft 13. This stub shaft is provided with a crank disk 14 having a crank pin 15, to which is attached a pitman 16 for driving the cutter bar. At this point the frame forms a yoke 17 around the crank disk, and to the forward part of this yoke the mower bar 18 is pivotally attached, as indicated.

As shown in Fig. 5, in the vicinity of the clutch composed of the members 10 and 11, the frame is formed into a gear case 19, and in the forward wall of this gear case a switch, plug or switch 20 is attached. The details of the construction of this switch are most clearly shown in Fig. 6. It comprises a nipple 21 which is fastened in the case, as shown, and this nipple has a head formed with an internally threaded socket 22. In this socket there is fastened an insulating plug 23, and sliding in this plug there is provided a stem 24. This stem has an enlarged head 25 which projects into the gear case, as indicated. Adjacent to the projecting head 25, the shaft 9 is provided with a disk 26 which is normally slightly removed from the end of the head, as shown. To the outer side of the insulating plug 23, a metallic cap nut 27 is attached, and to this cap nut there is removably attached a metallic bonnet 28. The stem 24 extends through into the bonnet 28 and is provided with a nut 29 and a check nut 30, as shown. A coil spring 31 is provided around the stem 24 and this thrusts against the inner side of the head 25 so as to maintain the nut 29 normally seated upon the cap 27. The forward end of the bonnet 28 is provided with a binding post 32, and to this binding post a circuit wire 33 is attached, which wire extends to the terminal 34 of a battery or voltaic cell 35 set at a convenient place, as for instance, on the pole 4 at the point shown in Fig. 1. The opposite terminal 36 is connected by a circuit wire 37 to a spark plug 38 of the engine. It should be understood that the engine rotates in a direction which will produce a tension in the coil spring 12, in other words, the stub shaft 13 is pulled through the spring, which constitutes a flexible transmission. From this arrangement if obstructions should come between the teeth of the cutter bar so as to arrest it, the spring 12 will coil itself more tightly; in this way it will shorten in length and tend to pull the transmission shaft 9 forwardly, thus sliding the shaft 9 in its bearing, and this advances the disk 26 against the head 25. In this way the nut 29 is moved off of its seat, that is, out of contact with the cap nut 27. It should be observed that the cap nut 27 is insulated from the stem 24; in this way the circuit through the ignition plug is broken. The ignition circuit is as follows: from the terminal 34, through the conductor 33, binding post 32, cap nut 27, nut 29, stem 24, head 25, nipple 21, to the frame; from the frame to the spark plug 38, and thence by the conductor 37 to the terminal 36. From this arrangement it should be understood that when an obstruction comes between the teeth of the mower bar, the ignition circuit is opened, and the engine will consequently stop.

The mechanism for automatically throwing the clutch open as the mower bar is raised will now be described: On the inner side of the wall of the gear case 19 I provide brackets 39, in which there is slidably mounted a shifting bar 40, as indicated most clearly in Fig. 2. To this shifting bar 40 there is rigidly attached a shifting yoke 41, which engages a double collar 42 formed on the clutch 11. This shifting yoke is further provided with a pin 43 which projects through the side of the gear case so as to extend into a cam slot 44, as indicated in Fig. 4. This cam slot is formed in a clutch lever 45, which is pivotally mounted on the side of the gear case at 46. This clutch lever 45 is extended upwardly and has a laterally-projecting foot rest 47, by means of which the driver may open or close the clutch. On the side of the clutch lever 45 a pawl 48 is mounted and this pawl coöperates with notches or shoulders 49 formed in a segment 50 fixed on the side of the gear case, as indicated in Fig. 4. A spring 51 is provided, that normally holds the pawl in engagement with the segment 50, as will be readily understood. Pivoted at 52 on the side of the foot lever, there is provided a releasing trigger 53, which is connected by a short link 54 with the pawl 48, so that if the forward or free end of the trigger is moved upwardly, the pawl will be released. On the rear side of the lever 45 is attached a coil spring 55, which extends rearwardly and is attached to the frame at the point 56, as shown. It should be understood that the cam slot 44 approaches the axis or pivot point 46 of the lever in an upward direction. From this arrangement it follows that if the lever 45 be pulled rearwardly, that is, in the direction of the arrow shown in Fig. 4, the slot will operate to pull the pin 43 forwardly. This moves the yoke 41 forwardly and in this way the clutch member 11 is thrown out of engagement with the clutch member 10. In order to trip the trigger 53, I provide a trip shaft 57, which extends transversely of the frame, being suitably mounted in bearings 58 and 59, as shown. Near the trigger 53, a cam toe 60 is rigidly attached to the trip shaft, and this toe is adapted to strike the trigger 53 when the trip shaft rotates in the direction of the arrow shown in Fig. 4. The bearing 59 is formed on a bracket 61, which also forms a bearing for the shaft 62 of the lifting lever 63 which raises the mower bar. This shaft 62 is provided with a rigid segment 64, which meshes with a pinion 65 on the trip shaft 57, as shown. The lifting lever 63 is provided with a laterally-projecting foot rest 66, and it will be evident that when the foot lever is moved forwardly the trip shaft will be rotated in the direction of the arrow, as represented in Fig. 4. The lifting lever 63 is connected by a link 67 with a bell crank lever 68 attached on the side of the tongue over the mower bar, and the mower bar is suspended from the horizontal arm of the bell crank lever by a chain 69, as indicated.

In raising the mower bar it will be evident that the mower bar rotates on the pivot connection at the forward side of the yoke 17. When the mower bar 63 is given a lifting movement, it will be evident that the lifting of the trigger 53 by the cam toe 60 will release the pawl 48 and the spring 55 will then pull the lever 45 over and open the clutch.

Having thus described my invention I claim as new and desire to secure by Letters Patent,—

1. In a mowing machine of the class described, a frame, an engine mounted thereupon and having an ignition circuit, a mower bar driven by said engine, and automatic means for opening said circuit when the movement of the mower bar is obstructed.

2. In a mowing machine of the class described, in combination, an engine, a mower bar, a flexible transmission device for driving said mower bar from said engine, an ignition circuit for operating said engine, and automatic means for opening said ignition circuit through the medium of said flexible transmission device.

3. In a mowing machine of the class described, in combination, a frame, an explosion engine mounted thereupon, an ignition circuit therefor, a switch in said ignition circuit, a mower bar, a flexible connection for driving said mower bar from said engine, and means for actuating said switch from said flexible connection.

4. In a mowing machine of the class described, in combination, a frame, an explosion engine mounted thereupon, an ignition circuit therefor, a switch plug having a projecting head adapted to open said circuit when moved, a mower bar, and a flexible connection for driving said mower bar from said engine, said flexible connection having a member adapted to engage said head to open said circuit.

5. In a mowing machine of the class described, in combination, a frame, an explosion engine mounted thereupon, an ignition circuit therefor, a mower bar, a coil spring connecting said mower bar with said engine and through which said engine is driven, said coil spring being adapted to shorten in length if the motion of said mower bar is obstructed, a member adapted to be advanced when said spring shortens, and means for opening said circuit actuated by said member.

6. In a mowing machine of the class described, in combination, a frame, an explosion engine mounted thereupon, an ignition circuit therefor, a mower bar, a spring through which said mower bar is driven from said engine, a transmission shaft connected with said spring and adapted to slide longitudinally, a disk carried by said transmission shaft and adapted to advance when said spring shortens, and a switch adapted to be engaged by said disk to open said circuit.

7 In a mowing machine, in combination, a frame, a motor mounted thereupon, a mower bar, a clutch through which said mower bar is driven from said motor, means tending to open said clutch, means for locking said clutch in a closed position, means for raising said mower bar, and automatic means for releasing said clutch and actuated by the means for raising the mower bar.

8. In a mowing machine, in combination, a frame, a motor mounted thereupon, a mower bar, a clutch for driving said mower bar from said motor, means tending to open said clutch, means for locking said clutch in its closed position, a trigger for releasing said last means, means for raising said mower bar, and a member actuated by said last means for actuating said trigger.

9. In a mowing machine, in combination, a frame, a motor mounted thereupon, a mower bar, a clutch for driving said mower bar from said motor, a clutch lever, a pawl carried thereby, a segment for coöperating with said pawl to lock said clutch against opening, a spring tending to open said clutch, means for raising said mower bar, and automatic means actuated by said last means for releasing said pawl.

10. In a mowing machine, in combination, a frame, a motor mounted thereupon, a mower bar, a clutch for driving said mower bar from said motor, a shifting yoke adapted to open said clutch, a lever having a cam slot engaging said yoke for opening said clutch, means for normally holding said lever in a position to lock said clutch closed, means for raising said mower bar, and means actuated by said last means for releasing said lever to open said clutch.

11. In a mowing machine, in combination, a frame, a motor mounted thereupon, a mower bar, a clutch for driving said mower bar from said motor, a sliding yoke adapted to open said clutch, a lever having a cam slot engaging said yoke for opening said clutch, means for normally holding said lever in a position to lock said clutch closed, means for raising said mower bar, means actuated by said last means for releasing said lever to open said clutch, and a spring to open said clutch.

12. In a mowing machine, in combination, a frame, a motor mounted thereupon, a mower bar, a clutch for driving said mower bar from said motor, a clutch lever, means for locking said lever with said clutch closed, means tending to open said clutch, a transverse trip shaft, means actuated thereby for releasing said clutch lever, a lifting lever for said mower bar, and means for rotating said trip shaft from said lifting lever.

13. In a mowing machine, in combination, a frame, a motor mounted thereupon, a mower bar, a clutch for driving said mower bar from said motor, a clutch lever having a cam slot, a yoke engaging said cam slot and adapted to open said clutch, a segment, a pawl carried by said clutch lever adapted to engage said segment to lock said clutch closed, means tending to open said clutch, a lifting lever for said mower bar, and mechanism between said lifting lever and said pawl for releasing said pawl.

14. In a mowing machine, in combination, a frame, a motor mounted thereupon, a mower bar, a clutch for driving said mower bar from said motor, a clutch lever having a cam slot, a sliding yoke adapted to open said clutch and engaging said cam slot, a segment, a spring-pressed pawl carried by said clutch lever and engaging said segment, a trigger adapted to release said pawl, a spring tending to open said clutch, a transverse trip shaft having a cam toe adapted to engage said trigger, a lifting lever for raising said mower bar, and mechanism for connecting said lever with said trip shaft and rotating the same.

In testimony whereof I have signed my name to this specification in the presence of two subscribing witnesses.

ALPHONSE M. LEONI.

Witnesses:
ALDO BOLOGNESI,
ALEXANDER BOLOGNESI.